United States Patent
Armstrong (10) Patent No.: US 11,738,482 B2
(45) Date of Patent: Aug. 29, 2023

(54) METHOD OF POTTING ELECTRICAL COMPONENTS INTO COMPLEX FINISHED FORMS

(71) Applicant: Jack Armstrong, Phoenix, AZ (US)

(72) Inventor: Jack Armstrong, Phoenix, AZ (US)

(73) Assignee: Jack Armstrong, Phoenix, AZ (US)

( * ) Notice: Subject to any disclaimer, the term of this patent is extended or adjusted under 35 U.S.C. 154(b) by 64 days.

(21) Appl. No.: 17/527,003

(22) Filed: Nov. 15, 2021

(65) Prior Publication Data

US 2022/0152885 A1    May 19, 2022

Related U.S. Application Data

(60) Provisional application No. 63/114,352, filed on Nov. 16, 2020.

(51) Int. Cl.
*B29C 39/10* (2006.01)
*B29C 39/36* (2006.01)
*B29C 33/58* (2006.01)
B29L 31/34 (2006.01)
B29K 63/00 (2006.01)

(52) U.S. Cl.
CPC .............. *B29C 39/10* (2013.01); *B29C 33/58* (2013.01); *B29C 39/36* (2013.01); *B29K 2063/00* (2013.01); *B29K 2995/0026* (2013.01); *B29L 2031/3406* (2013.01)

(58) Field of Classification Search
CPC ..... B29C 39/123; B29C 39/10; B29C 39/025; B29C 39/021
See application file for complete search history.

(56) References Cited

U.S. PATENT DOCUMENTS 5,951,813 A * 9/1999 Warren .................. B29C 39/10
156/305
7,365,416 B2    4/2008 Kawabata
(Continued)

FOREIGN PATENT DOCUMENTS

| CA | 2343660 A1 | 11/2001 |
| DE | 102007008487 | * 8/2008 |
| GB | 2466633 | * 7/2010 |

OTHER PUBLICATIONS

Tyler R. Ray, Jungil Choi, Amay J. Bandodkar, Siddharth Krishnan, Philipp Gutruf, Limei Tian, Roozbeh Ghaffari, and John A. Rogers, Bio-Integrated Wearable Systems: A Comprehensive Review, Chemical Reviews, 2019.

*Primary Examiner* — Edmund H Lee (57) ABSTRACT

A method for potting electrical components into complex finishing forms is presented. A releasing agent is added into a mold cavity. Next, an initial layer of potting compound is added into the mold cavity. A label layer is added into the initial layer of the potting compound. A set of electronic components is added over the label layer. An interstitial layer of potting compound is added over the set of electronic components. A reinforcement layer is added along the interstitial layer. A finishing layer of the potting compound is added over the reinforcement layer forming an uncured potted electronic product. The uncured potted electronic product is cured within the mold cavity in order to produce a cured potted electronic product. The cured potted electronic product is released from the negative mold using a releasing device.

10 Claims, 9 Drawing Sheets

(56) References Cited

U.S. PATENT DOCUMENTS

| | | | |
|---|---|---|---|
| 7,443,021 B2 | 10/2008 | Nakatani | |
| 9,554,484 B2 | 1/2017 | Rogers | |
| 2009/0189316 A1* | 7/2009 | Chang | B29C 35/02 |
| | | | 264/447 |
| 2010/0038301 A1* | 2/2010 | Lee | B01D 63/022 |
| | | | 156/60 |
| 2011/0111126 A1 | 5/2011 | Montoya | |
| 2012/0107975 A1* | 5/2012 | Chan | H01L 33/62 |
| | | | 257/E33.061 |
| 2013/0043502 A1* | 2/2013 | Koya | H01L 24/48 |
| | | | 257/E33.056 |
| 2014/0021744 A1* | 1/2014 | Imamura | B62D 21/157 |
| | | | 296/187.08 |
| 2014/0066790 A1 | 3/2014 | Burkett et al. | |
| 2014/0217444 A1* | 8/2014 | Keith | H01L 33/56 |
| | | | 438/27 |
| 2018/0328064 A1 | 11/2018 | Peastrel et al. | |
| 2020/0066933 A1* | 2/2020 | Nakano | H01L 33/508 |

* cited by examiner

METHOD OF POTTING ELECTRICAL COMPONENTS INTO COMPLEX FINISHED FORMS

FIELD OF THE INVENTION

The present invention generally relates to the field of electronics manufacture. More specifically, the present invention recites a method for molding complex shapes from a potting material during a cure process, wherein said complex shapes are uniquely suitable for attachment to animal collars, harnesses, or other wearable items via conventional fastening means.

BACKGROUND OF THE INVENTION

Electrical components, exposed-circuit printed boards in particular, are relatively fragile components of most complex electrical systems. Conductive debris, abrasives, moisture, or corrosive contaminants can rapidly degrade the circuits, short the entire system, or degrade the underlying silicon or plastic structure of the boards themselves. To prevent premature failure of these components, manufacturers commonly 'pot' the boards, encasing the sensitive elements in a durable, non-reactive, non-conductive layer of packing material. This potting process may utilize most forms of castable plastics, including polyurethane, silicone, or epoxy resins dependent on the use-case and operating environment of the electrical system. The potting process typically utilizes some form of permanent or pre-formed mold, wherein the electrical components are positioned within the mold before being immersed in packing material. The mold will remain permanently fixed to the electrical components via the packing material, generally with contacts or leads exposed outside of the cast material. Though functional, this method of manufacture requires that a pre-sized mold is provided for every finished component, restricting the finished product to set dimensions and limiting the type and variety of electrical systems that may be encased within. Further, the extant processes do not fully utilize the inherent durability of modern epoxy resins, which may be equal to or greater than the pre-formed molds.

It is therefore proposed that a novel manufacturing process utilizing a deformable, potting enclosure offers improved cost-per unit and design flexibility to manufacturers and designers of potted electrical products. The use of a partially cured potting material, subjected to a post-mold conformation process, is presented as a novel improvement in the field of electronic enclosures. Through iterative testing, the proposed invention has demonstrated improved durability over conventional enclosures while simultaneously enabling the formation of the enclosure to conform to any solid profile. Benefits are broadly contemplated within the field of wearable technology, specifically directed towards device enclosures mounted to pet collars and harnesses. These enclosures must withstand sustained environmental hazards without compromising the integrity of the devices carried therein, often under strict limitations to the size and weight of said enclosures. Durability of such enclosures is of particular concern for devices supporting an internal power supply—breaching any battery cells strapped to an animal would likely result in serious injury to the animal or their handler.

SUMMARY OF THE INVENTION

The present invention aims to provide a means and method for creating complex finished forms of potted electronics, including configuration of internal illuminators or other visual elements within the castable material prior to final setting or curing of the moldable potting material. The enclosure of a power supply and electronic components within the proposed assembly is further contemplated to provide superior resistance against shock, moisture intrusion, or mechanical damage known to cause catastrophic failure of any internal power supplies, i.e. battery cells.

DETAILED DESCRIPTION OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
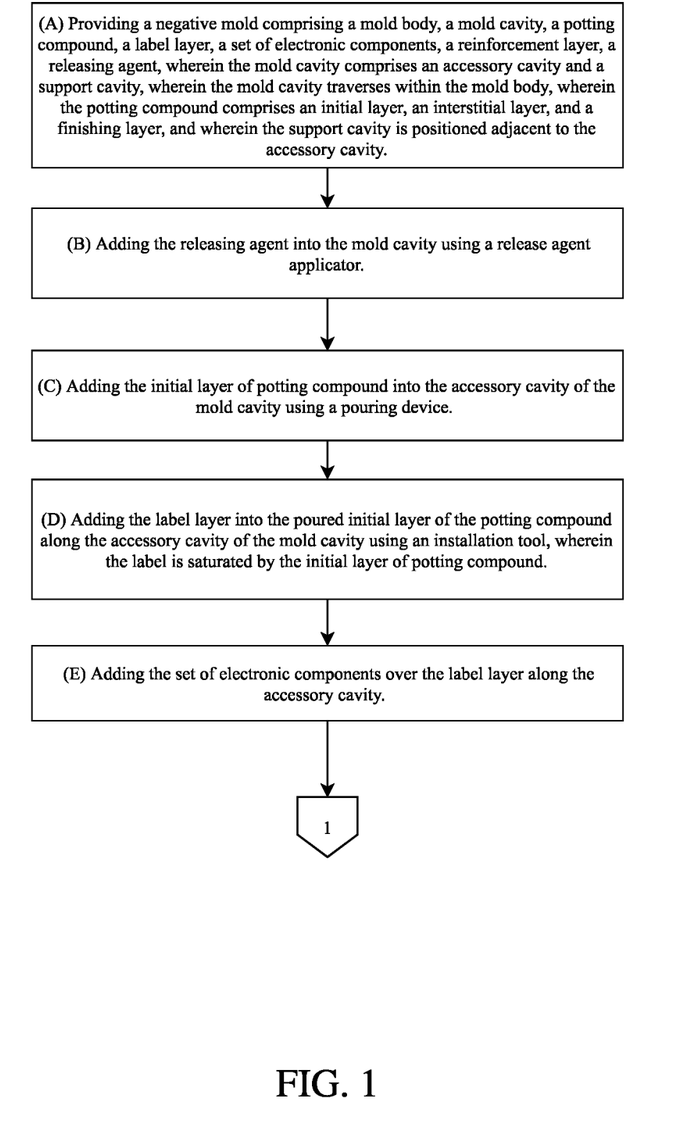
FIG. 1 is a flowchart illustrating the present invention.
Figure 2:
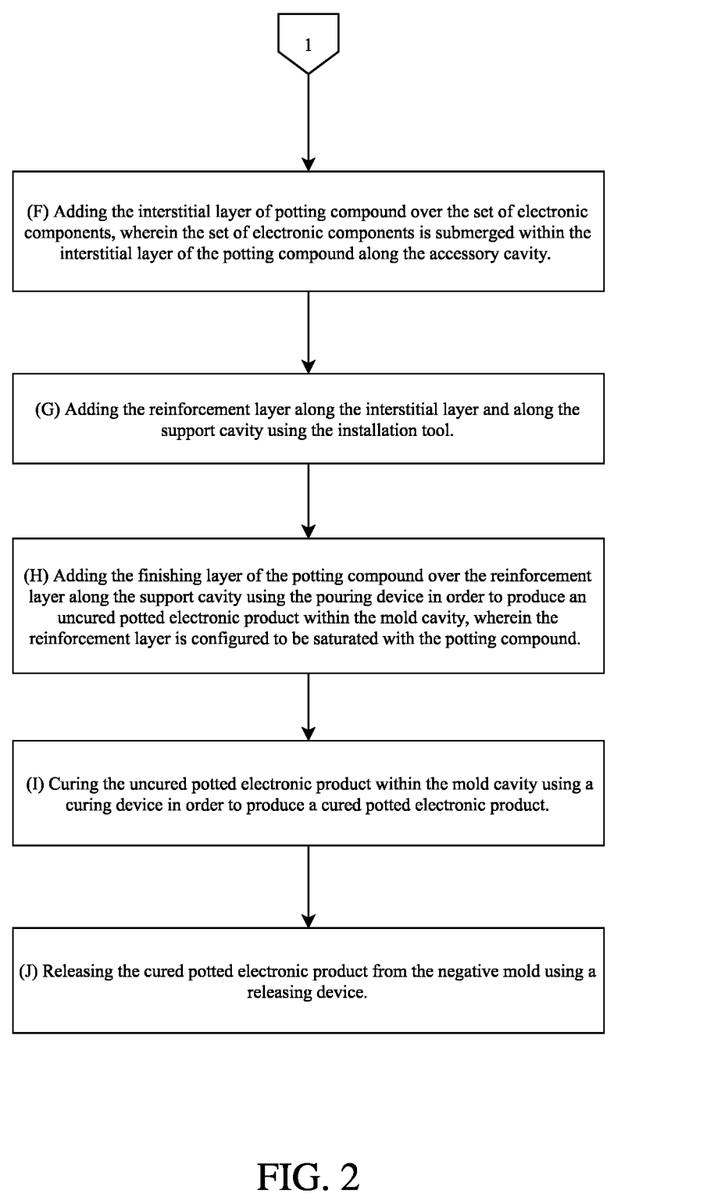
FIG. 2 is a continuing flowchart illustrating the present invention that continues along continuation arrow 1 in FIG. 1.
Figure 3:
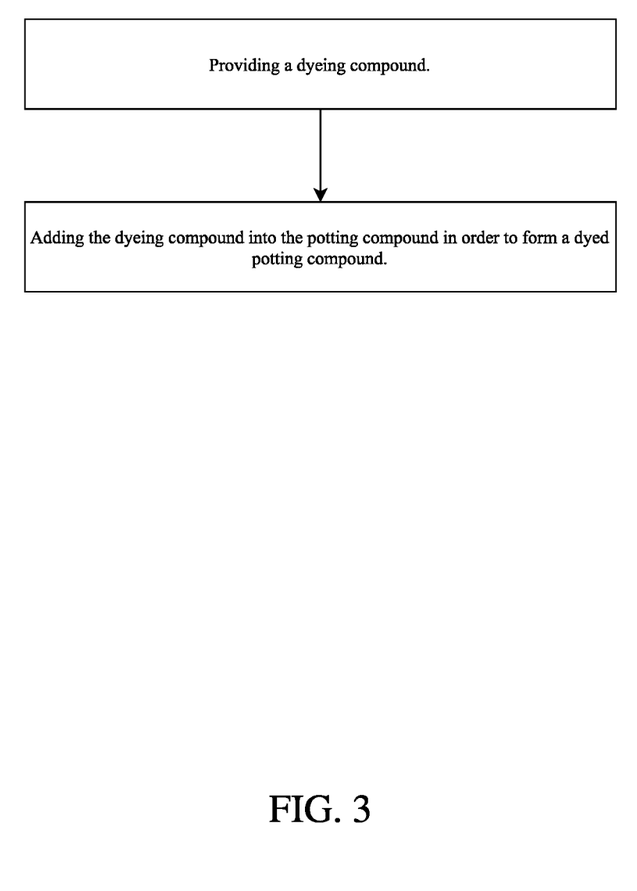
FIG. 3 is a flowchart illustrating a dyeing compound being added to a potting compound.
Figure 8:
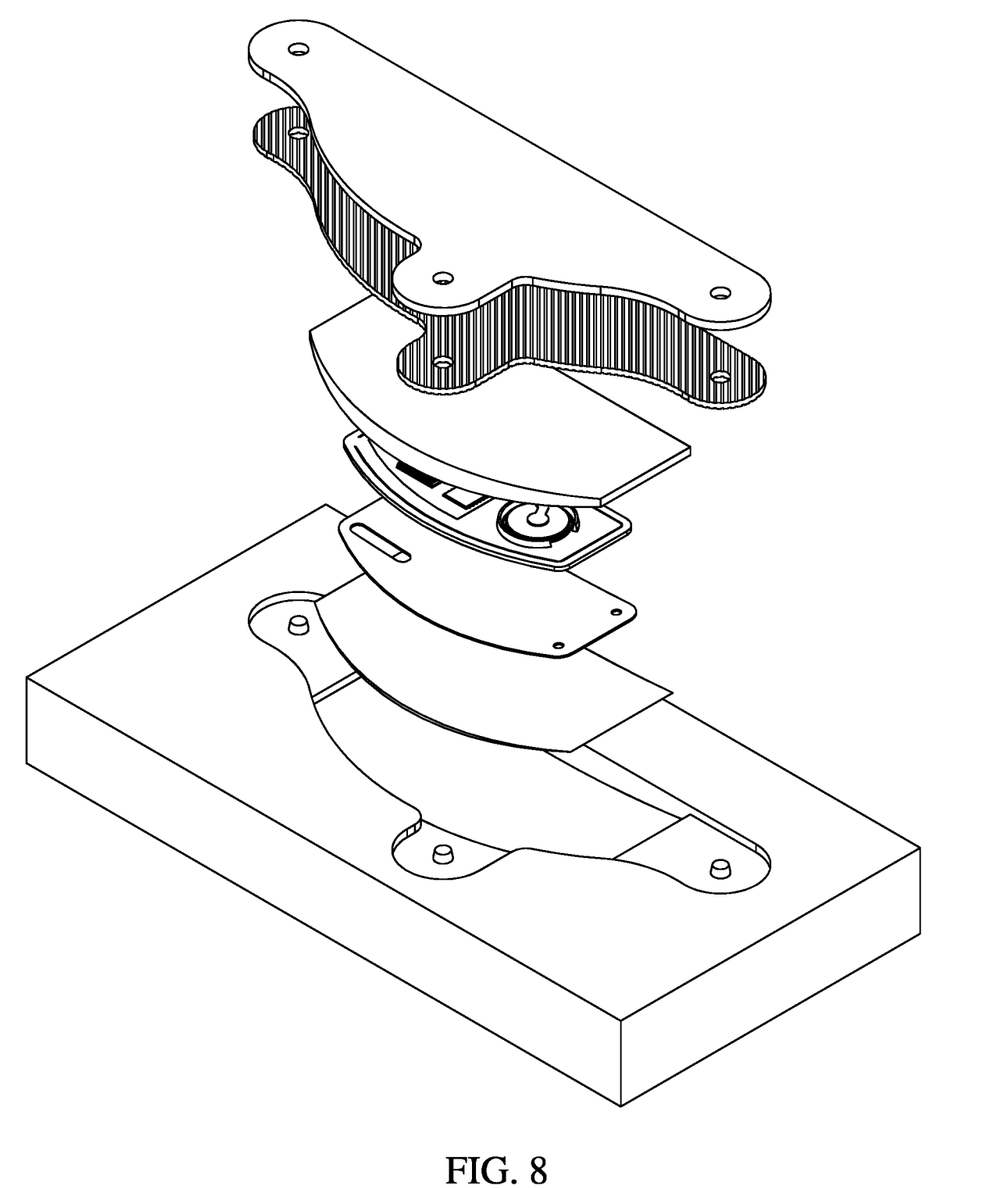
FIG. 8 is an exploded view of the present invention.

In reference to FIGS. 1-6, the present invention is a method for potting electrical components into complex finishing forms. In reference to FIG. 8, a negative mold that comprises a mold body, a mold cavity, a potting compound, a label layer, a set of electronic components, a reinforcement layer, a releasing agent, where the mold cavity comprises an accessory cavity and a support cavity, where the mold cavity traverses within the mold body, where the potting compound comprises an initial layer, an interstitial layer, and a finishing layer, and where the support cavity is positioned adjacent to the accessory cavity are provided (Step A). In the preferred embodiment, the potting compound takes the form of any suitable epoxy compound such as but not limited to two-part epoxy compounds comprising a resin and a catalyst. In one embodiment, the potting compound comprises 0-295 ml of resin mixed with 0-85 ml of catalyst. In the preferred embodiment, the potting compound is constructed out of a slow curing epoxy mixture. In the preferred embodiment, the potting compound is transparent. In another embodiment, a dyeing compound is further provided, as shown in FIG. 2. The dyeing compound is added into the potting compound in order to form a dyed potting compound. In the preferred embodiment, the negative mold takes the form of any suitable mold used for negative malformation processes. In the preferred embodiment, the negative mold is made out of any suitable material, such as, but not limited to plaster, silicone, or any other suitable material. The mold body is the main chassis of the negative mold that facilitates the mold cavity. The mold cavity is the casted or cut out impression of the negative mold. The releasing agent is added into the mold cavity using a release agent applicator (Step B).

Figure 4:
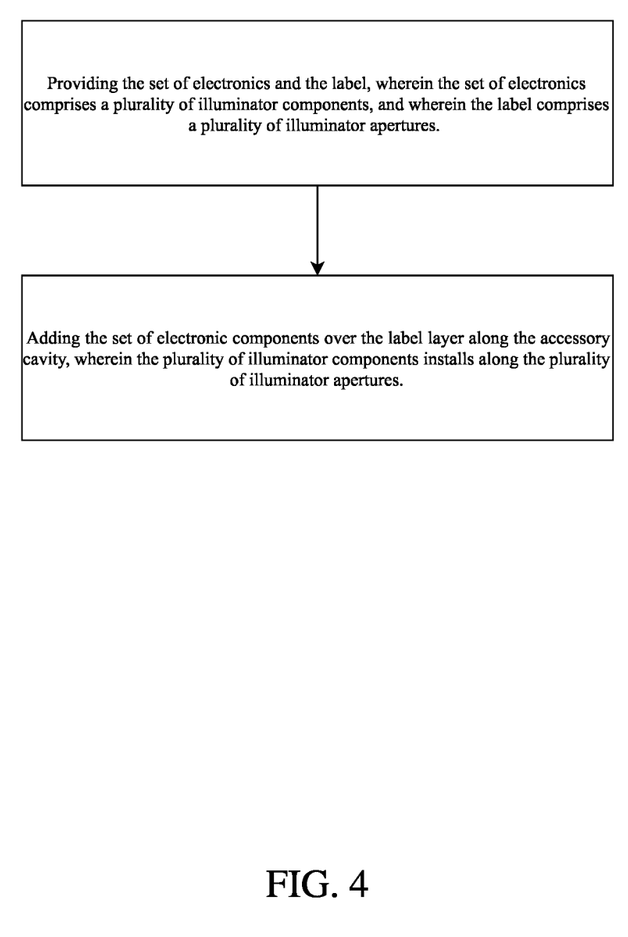
FIG. 4 is a flowchart illustrating a plurality of illuminator components being installed along the present invention.

In the preferred embodiment, the releasing agent takes the form of any suitable epoxy releasing agent that prevents epoxy resins from sticking to the mold cavity. In the preferred embodiment, the releasing agent may take the form of polyvinyl alcohol or any other suitable releasing agent. In the preferred embodiment, the releasing agent applicator takes the form of any suitable releasing agent applicator that applies a sufficient layer of releasing agent along the mold cavity. In the preferred embodiment, the releasing agent applicator takes the form of an aerosol spray applicator or any other suitable releasing agent applicator. Next, the initial layer of potting compound is added into the accessory cavity of the mold cavity using a pouring device (Step C). In the preferred embodiment, the pouring device takes the form of any suitable pouring machine such as, but not limited to bottom pour epoxy dispensing units or any other suitable pouring machine. Next, the label layer is added into the pouring initial layer of the potting compound along the accessory cavity of the mold cavity using an installation tool, where the label is saturated by the initial layer of potting compound (Step D). In the preferred embodiment, the label is constructed out of a permeable material, such as, but not limited to paper, fiberglass, aramid material, or any other suitable material. In the preferred embodiment, the installation tool takes the form of any suitable installation tool that installs the label along the initial layer, such as, but not limited to label dispensing units, or any other suitable installation tool. Next, the set of electronic components is added over the label layer along the accessory cavity (Step E). In the preferred embodiment, the set of electronics takes the form of electronic devices associated with wearable technology, such as, but not limited to trackers, transmitters, batteries, lamps, microphones, cameras, portable communication devices, or any other suitable electronic device. In another embodiment, the set of electronics that comprises a plurality of illuminator components is provided, as shown in FIG. 4.

Figure 5:
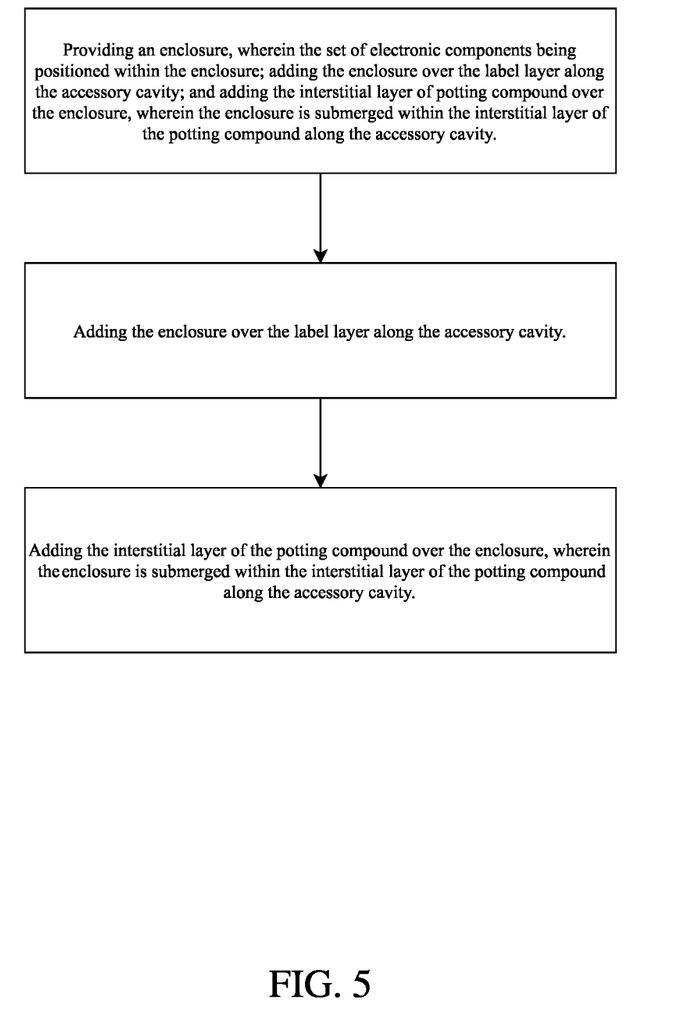
FIG. 5 is a flowchart illustrating an enclosure being installed along the present invention.
Figure 6:
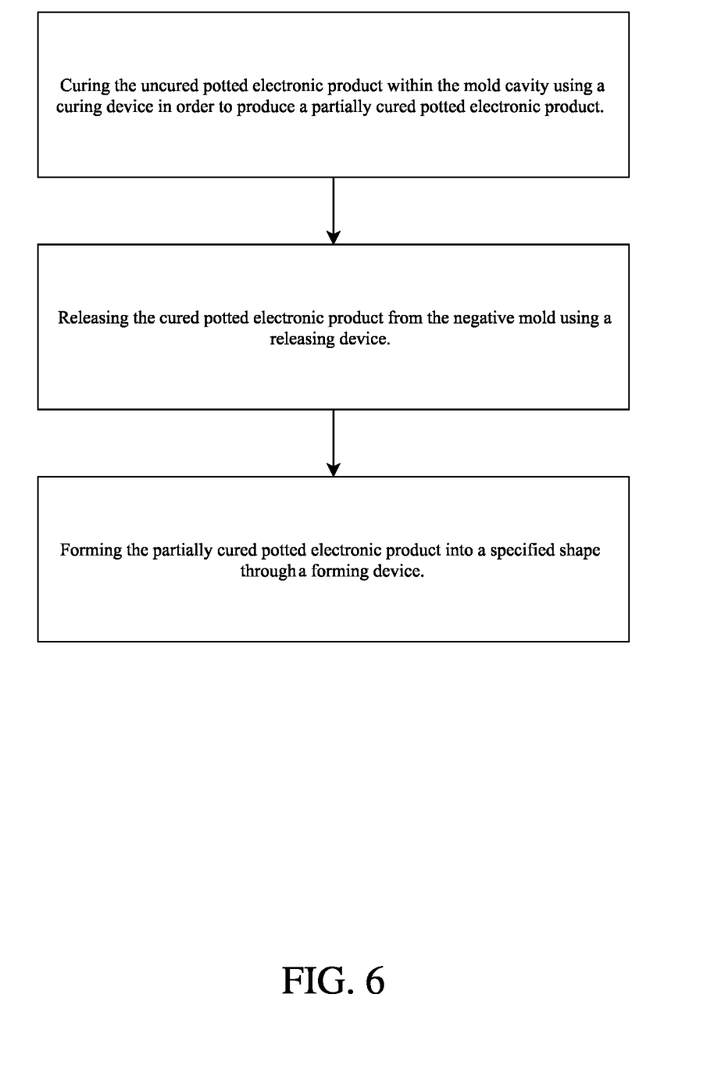
FIG. 6 is a flowchart illustrating the present invention, in accordance with another embodiment.

The label that comprises a plurality of illuminator apertures is provided. The set of electronic components is added over the label layer along the accessory cavity, where the plurality of illuminator components installs along the plurality of illuminator apertures. In the preferred embodiment, an enclosure, where the set of electronic components is positioned within the enclosure is provided, as shown in FIG. 5. The enclosure is added over the label layer along the accessory cavity. The interstitial layer of the potting compound is added over the enclosure, where the enclosure is submerged within the interstitial layer of the potting compound along the accessory cavity. Next, the interstitial layer of potting compound is added over the set of electronic components, where the set of electronic components is submerged within the interstitial layer of the potting compound along the accessory cavity (Step F). In the preferred embodiment, the accessory cavity facilitates the set of electronics along the mold cavity. More specifically, the accessory cavity forms the set of electronics casted in the potting compound to any suitable shape. Next, the reinforcement layer is added along the interstitial layer and along the support cavity using the installation tool (Step G). In the preferred embodiment, the reinforcement layer is made out of an aramid material, such as, but not limited to fiberglass, carbon fiber, or any other suitable aramid material. The support cavity holds the reinforcement layer along the mold cavity. More specifically, the support cavity forms the reinforcement layer to any suitable shape suitable for mounting the set of electronics along an animal collar, harness, or any other wearable article. The reinforcement layer provides further structural rigidity and integrity to the set of electronics casted in the potting compound. Next, the finishing layer of the potting compound is added over the reinforcement layer along the support cavity using the pouring device in order to produce an uncured potted electronic product within the mold cavity, where the reinforcement layer is saturated with the potting compound (Step H).

Figure 7:
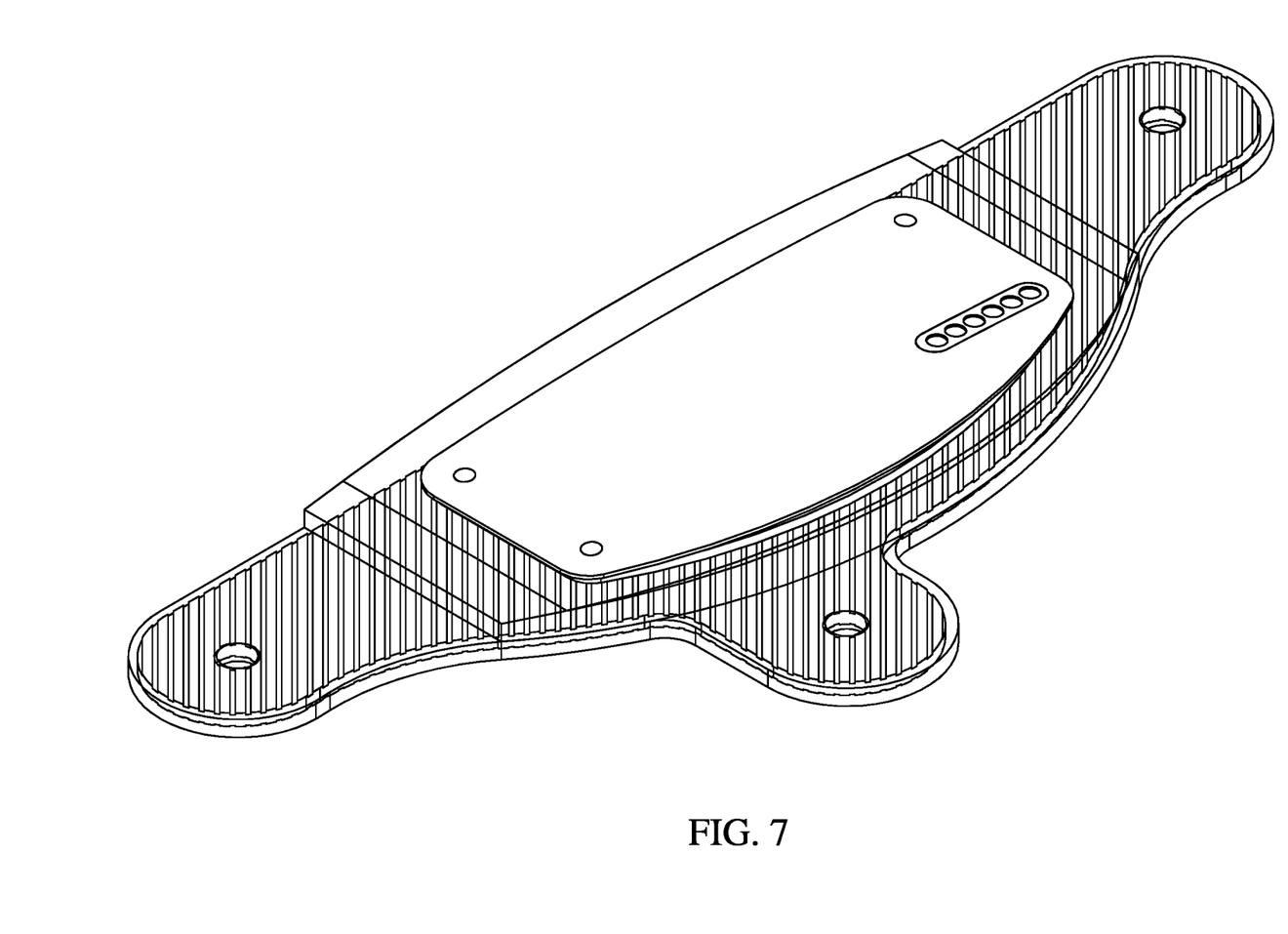
FIG. 7 is a top perspective view of the present invention.
Figure 9:
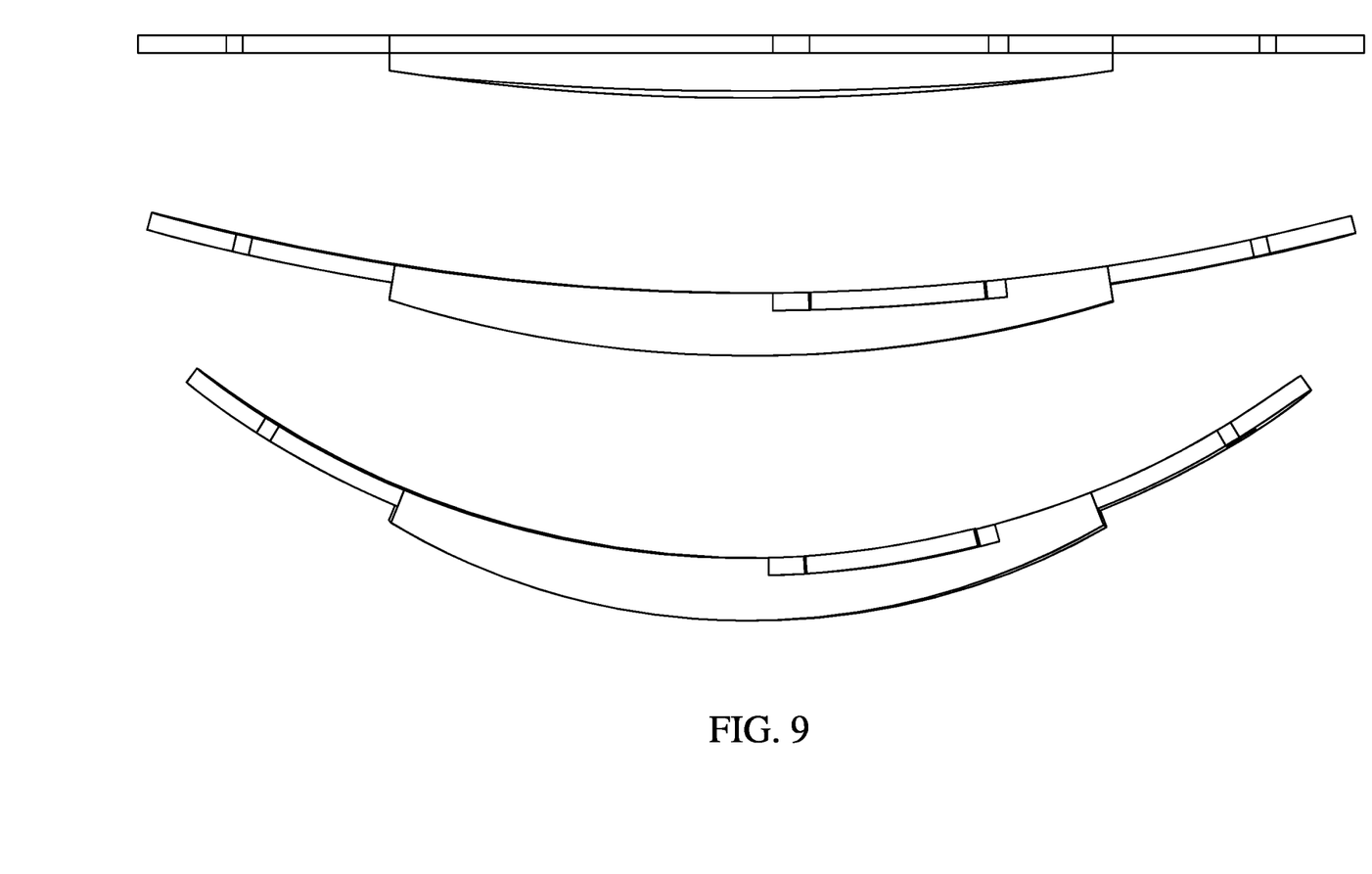
FIG. 9 is a side view of the present invention, in accordance with another embodiment.

Next, the uncured potted electronic product is cured within the mold cavity using a curing device in order to produce a cured potted electronic product (Step I). In the preferred embodiment, the curing device takes the form of any suitable curing device that aids in accelerating or executing the curing process, such as, but not limited to UV light curing devices, curing agent applicators, heating elements, or any other suitable devices that aid in the curing process. Finally, the cured potted electronic product is released from the negative mold using a releasing device (Step J). In the preferred embodiment, the releasing device takes the form of any suitable releasing device to aid in releasing the cured potted electronic product from the mold cavity, such as, but not limited to vibration units, heating elements, cooling elements, mechanical release machines, or any other suitable device. In another embodiment, the uncured potted electronic product is cured within the mold cavity using the curing device in order to produce a partially cured potted electronic product. The cured potted electronic product, as shown in FIG. 7, is released from the negative mold using the releasing device. The partially cured potted electronic product is formed into a specified shape through a forming device. In this embodiment, the partially cured potted electronic product is formed into ergonomic shapes suitable for installing along an animal, as shown in FIG. 9. In this embodiment, the forming device takes the form of any suitable forming device, such as, but not limited to the utilization of a positive mold device, such that the partially cured potted electronic product is pressed along the positive mold device with any suitable press machine, tool, or implement to form a shaped potted electronic product. Next, the shaped potted electronic product is cured along the positive mold device using the curing device in order to produce the cured potted electronic product. Finally, the cured potted electronic product is released from the positive mold using a releasing device.

Although the invention has been explained in relation to its preferred embodiment, it is to be understood that many other possible modifications and variations can be made without departing from the spirit and scope of the invention as hereinafter claimed.

What is claimed is:

1. A method for potting electrical components into complex finished forms comprising the steps of:
   (A) providing a negative mold comprising a mold body, a mold cavity, a potting compound, a label layer, a set of electronic components, a reinforcement layer, a releasing agent, wherein the mold cavity comprises an accessory cavity and a support cavity, wherein the mold cavity traverses within the mold body, wherein the potting compound comprises an initial layer, an interstitial layer, and a finishing layer, and wherein the support cavity is positioned adjacent to the accessory cavity;

(B) adding the releasing agent into the mold cavity using a release agent applicator;

(C) adding the initial layer of potting compound into the accessory cavity of the mold cavity using a pouring device;

(D) adding the label layer into the poured initial layer of the potting compound along the accessory cavity of the mold cavity using an installation tool, wherein the label layer is saturated by the initial layer of potting compound;

(E) adding the set of electronic components over the saturated label layer along the accessory cavity;

(F) adding the interstitial layer of potting compound over the set of electronic components that was added over the saturated label layer, wherein the set of electronic components that was added over the saturated label layer is submerged within the interstitial layer of the potting compound along the accessory cavity;

(G) adding the reinforcement layer along the interstitial layer and along the support cavity using the installation tool;

(H) adding the finishing layer of the potting compound over the reinforcement layer along the support cavity using the pouring device in order to produce an uncured potted electronic product within the mold cavity, wherein the reinforcement layer is saturated with the potting compound;

(I) curing the uncured potted electronic product within the mold cavity using a curing device in order to produce a cured potted electronic product; and (J) releasing the cured potted electronic product from the negative mold using a releasing device.

2. The method for potting electrical components into complex finished forms as claimed in claim 1, wherein the potting compound comprises a resin and a catalyst.

3. The method for potting electrical components into complex finished forms as claimed in claim 1, wherein the potting compound is transparent.

4. The method for potting electrical components into complex finished forms as claimed in claim 1, wherein the potting compound is constructed out of a slow curing epoxy mixture.

5. The method for potting electrical components into complex finished forms as claimed in claim 1, the method comprising the steps of:
providing a dyeing compound; and
adding the dyeing compound into the potting compound in order to form a dyed potting compound.

6. The method for potting electrical components into complex finished forms as claimed in claim 1, wherein the label is constructed out of a permeable material.

7. The method for potting electrical components into complex finished forms as claimed in claim 1, the method comprising the steps of:
providing the set of electronics and the label layer, wherein the set of electronics comprises a plurality of illuminator components, and wherein the label layer comprises a plurality of illuminator apertures; and
adding the set of electronic components over the saturated label layer along the accessory cavity, wherein the plurality of illuminator components installs along the plurality of illuminator apertures.

8. The method for potting electrical components into complex finished forms as claimed in claim 1, the method comprising the steps of:
providing an enclosure, wherein the set of electronic components being positioned within the enclosure;
adding the enclosure over the saturated label layer along the accessory cavity; and
adding the interstitial layer of the potting compound over the enclosure that was added over the saturated label layer along the accessory cavity, wherein the enclosure that was added over the saturated label layer along the accessory cavity is submerged within the interstitial layer of the potting compound along the accessory cavity.

9. The method for potting electrical components into complex finished forms as claimed in claim 1, wherein the reinforcement layer being made out of an aramid material.

10. The method for potting electrical components into complex finished forms as claimed in claim 1, the method comprising the steps of:
curing the uncured potted electronic product within the mold cavity using a curing device in order to produce a partially cured potted electronic product;
releasing the cured potted electronic product from the negative mold using the releasing device; and
forming the partially cured potted electronic product into a specified shape through a forming device.

* * * * *